(12) United States Patent
Sakamaki

(10) Patent No.: US 6,317,757 B1
(45) Date of Patent: *Nov. 13, 2001

(54) WEB PAGE DISPLAY SYSTEM UTILIZING LOCALLY STORED IMAGE DATA COMPONENTS THAT ARE INTEGRATED ACCORDING TO PART COMBINATION INFORMATION TRANSMITTED BY A SERVER

(75) Inventor: Katsuya Sakamaki, Tachikawa (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,384

(22) Filed: Mar. 30, 1998

(30) Foreign Application Priority Data

Apr. 4, 1997 (JP) ...................................................... 9-100818

(51) Int. Cl.[7] ............................ G06F 15/00; G06F 17/00; G06F 17/24; G06F 17/21
(52) U.S. Cl. ......................... 707/502; 345/435; 707/501; 709/217
(58) Field of Search ..................................... 707/502, 513, 707/501, 10; 345/348, 349, 435; 709/203, 217

(56) References Cited

U.S. PATENT DOCUMENTS

| | | | | |
|---|---|---|---|---|
| 5,649,186 | * | 7/1997 | Ferguson | 707/10 |
| 5,659,729 | * | 8/1997 | Nielsen | 707/3 |
| 5,721,908 | * | 2/1998 | Lagarde et al. | 707/10 |
| 5,761,663 | * | 6/1998 | Largard et al. | 707/10 |
| 5,778,367 | * | 7/1998 | Wesinger, Jr. et al. | 707/10 |
| 5,793,966 | * | 8/1998 | Amstein et al. | 709/203 |
| 5,812,776 | * | 9/1998 | Gifford | 709/217 |
| 5,880,740 | * | 3/1999 | Halliday et al. | 345/435 |
| 5,890,170 | * | 3/1999 | Sidana | 707/501 |
| 6,026,433 | * | 2/2000 | D'Arlach et al. | 709/217 |

OTHER PUBLICATIONS

Stieren, Carl et al., Designing two nonprofit Web sites on less than $350 US per year each, Annual ACM Conference on Systems Documentation, pp. 271–280, Oct. 1996.*

Catlin, Karen S. et al., Hypermedia Templates: an author's tool, ACM Conference on Hypertext and Hypermedia, Dec. 15–18, 1991, pp. 147–160.*

* cited by examiner

*Primary Examiner*—Stephen S. Hong
*Assistant Examiner*—William L. Bashore
(74) *Attorney, Agent, or Firm*—Frishauf, Holtz, Goodman, Langer & Chick, P.C.

(57) ABSTRACT

Home pages displayed at terminals are each defined by a combination of multiple parts. The terminal stores home page configuration data and a plurality of items of image data for each part. In creating his or her own home page, the user of the terminal operates an input unit to select an image of each part. Also, the user enters personal information to be made public on the home page. The parts information and personal information thus entered are sent to a server and then stored therein. In order for the user of the terminal to watch another person's home page, the server sends part information of another person's home page as opposed to image data to the user's terminal. The user's terminal combines parts of image data it stores in accordance with the parts information recieved from the server to create and display the another person's home page.

13 Claims, 13 Drawing Sheets

|  | b0 | b1 | b2 | b3 |
|---|---|---|---|---|
| ROOF | 1 | 0 | 0 | 0 |
| WINDOW | 0 | 0 | 1 | 0 |
| DOOR | 0 | 1 | 0 | 0 |
| MAILBOX | 0 | 1 | 0 | 0 |

WEB PAGE DISPLAY SYSTEM UTILIZING LOCALLY STORED IMAGE DATA COMPONENTS THAT ARE INTEGRATED ACCORDING TO PART COMBINATION INFORMATION TRANSMITTED BY A SERVER

BACKGROUND OF THE INVENTION

The present invention relates to an information providing system which permits users to create information issuing screen images, such as home pages, with simple operations.

This application is based on Japanese Patent Application No. 9-100818, filed Apr. 4, 1998, the content of which is incorporated herein by reference.

Information can be issued to anyone in the world over the Internet by setting up a home page on the WWW (World Wide Web). The utilization of home pages is not restricted to specific persons. Any person can set up a home page if he or she has a personal computer. As information issuing means, therefore, the home pages set up on the WWW have attracted attention in recent years.

A home page is set up under a contract with a WWW service provider. However, the home page itself must generally be created by the user. For this reason, there is now commercially available application software that is adapted to create home pages. However, some special knowledge is required to create a home page even if the commercially available application software is used.

In contrast, one way to allow those who have no special knowledge to set up their own home pages will be to request dealers concerned to create the home pages. However, this entails cost.

Therefore, it is not so easy for an individual to set up a home page at present.

BRIEF SUMMARY OF THE INVENTION

Accordingly, it is an object of the present invention to provide an information providing system which allows anyone to issue information easily.

It is another object of the present invention to provide a server and a terminal unit for use with the above mentioned information providing system.

According to the present invention, an information providing system comprises a server; and clients adapted to be connected to the server over a communications network. The clients comprise an image data memory for storing plural image data for each of plural parts of an information issuing screen image; part combination information receiving means for receiving part combination information representing a combination of image data forming a given information issuing screen image from said server; and screen image creating means for reading plural image data for each of the plural parts of the given information issuing screen image from the image data memory in accordance with the part combination information received by the receiving means and creating the given information issuing screen image by combining read image data. The server comprises a user screen image information memory for storing part combination information representing combinations of image data forming information issuing screen images specific to each of said clients; and transmission means responsive to a request from a first client for reading the part combination information associated with a second client from the user screen image information memory and sending read part combination information to the first client.

According to the present invention, a server adapted to be connected over a network to clients having an image data memory for storing plural image data for each of plural parts of an information issuing screen image, comprises a user screen image information memory for storing combination information representing combinations of image data forming information issuing screen images specific to each of the clients; and transmission means responsive to a request from a first client for reading the part combination information associated with a second client from the user screen image information memory and sending read part combination information to the first client, whereby the first client creates an information issuing screen image based on the part combination information.

According to the present invention, a terminal device adapted for receiving personal information about members registered in a service center from a server over a communication network, comprises a display unit; an image data memory for storing plural image data for each of plural parts of an information issuing screen image; part combination information receiving means for receiving part combination information representing a combination of image data forming an information issuing screen image from the server; and screen image creating means, responsive to the part combination information received by said receiving means, for reading image data from the image data memory and displaying the information issuing screen image on the display unit.

According to the information providing system of the present invention, the clients share parts of image data that make up home pages. Each user simply selects desired image data parts to create a home page specific to him or her. Thus, each user can create an information issuing screen image to introduce him or her to other persons without special knowledge. To watch a home page of another person, the user simply receives information representing a combination of parts as opposed to a home page image itself. In this case, the terminal creates the home page of another person based on the received parts combination information. Therefore, the time and cost required to transmit image data can be reduced.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of an information providing system according to the present invention will now be described with reference to the accompanying drawings.

Figure 1:
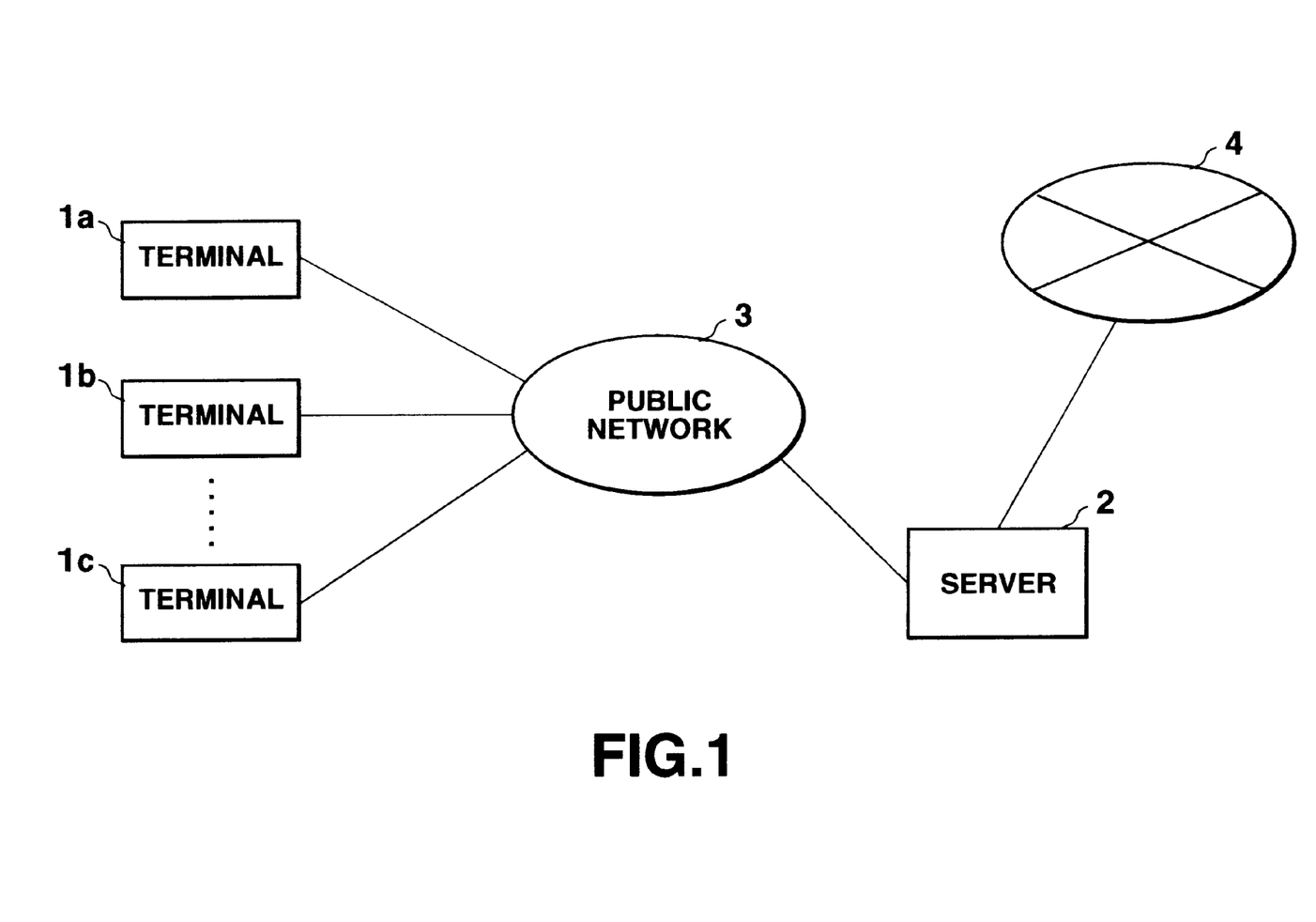
FIG. 1 is a schematic representation of a computer network to which the information providing system of the present invention is connected.

Referring now to FIG. 1, there is illustrated a computer network system to which the information providing system of the present invention is connected, which includes terminals 1a, 1b and 1c and, a server 2, which are interconnected by a public network 3, and the Internet 4 connected to the server 2.

The terminals 1a, 1b and 1c each is a portable information terminal called a personal digital assistant (PDA) or electronic pocket notebook. The terminals, which are clients that accept services from the server 2, create home page data and send it to the server 2 as will be described later.

The server 2 is installed in a WWW service provider. The server 2 performs processing of setting up home pages, accessing other service providers interconnected by the Internet 4, providing e-mail services, etc. In addition, the server 2 provides to each member a service of selecting a specific person from the members and introducing him or her to the member as a friend or a person to communicate with on the basis of condition data received from the terminals.

The public network 3 comprises communication lines, such as telephone lines or ISDN lines, provided by an electric communication service company.

The Internet 4 comprises multiple computer networks (LAN/WAN) which are connected together. A large number of service providers is connected to the Internet 4.

Figure 2:
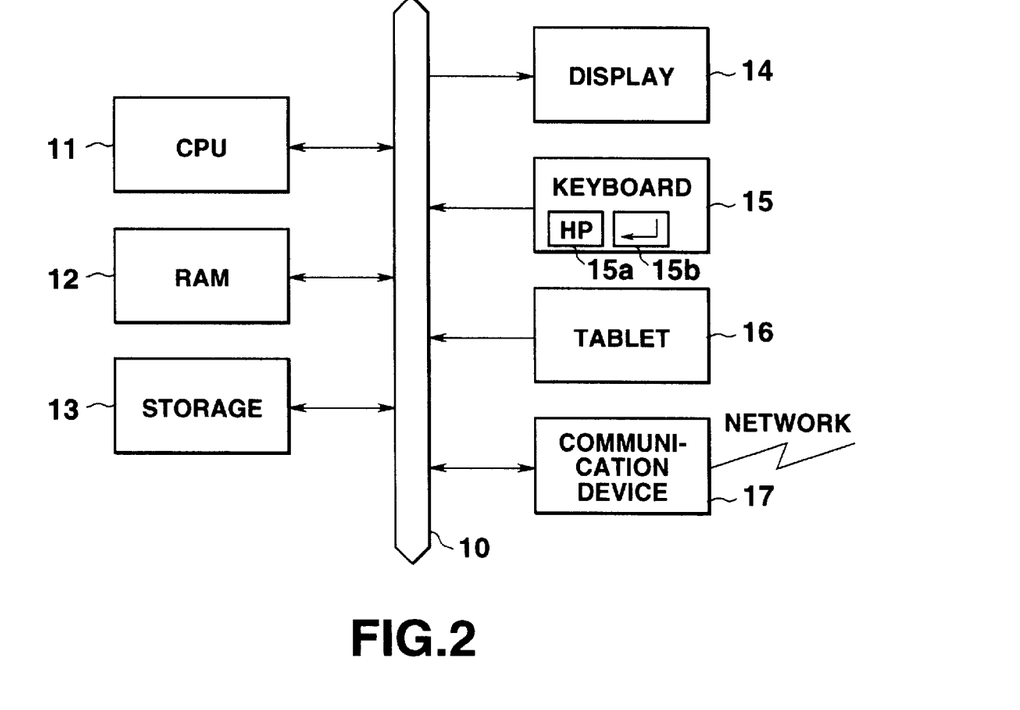
FIG. 2 is a block diagram of a terminal used in the information providing system of the present invention.

FIG. 2 shows in block diagram form each of the terminals 1a to 1c.

As shown, each of the terminals 1a to 1c comprises a CPU (Central Processing Unit) 11, a RAM (Random Access Memory) 12, a storage unit 13, a display unit 14, a keyboard 15, a tablet 16, and a communication device 17.

Figure 8:
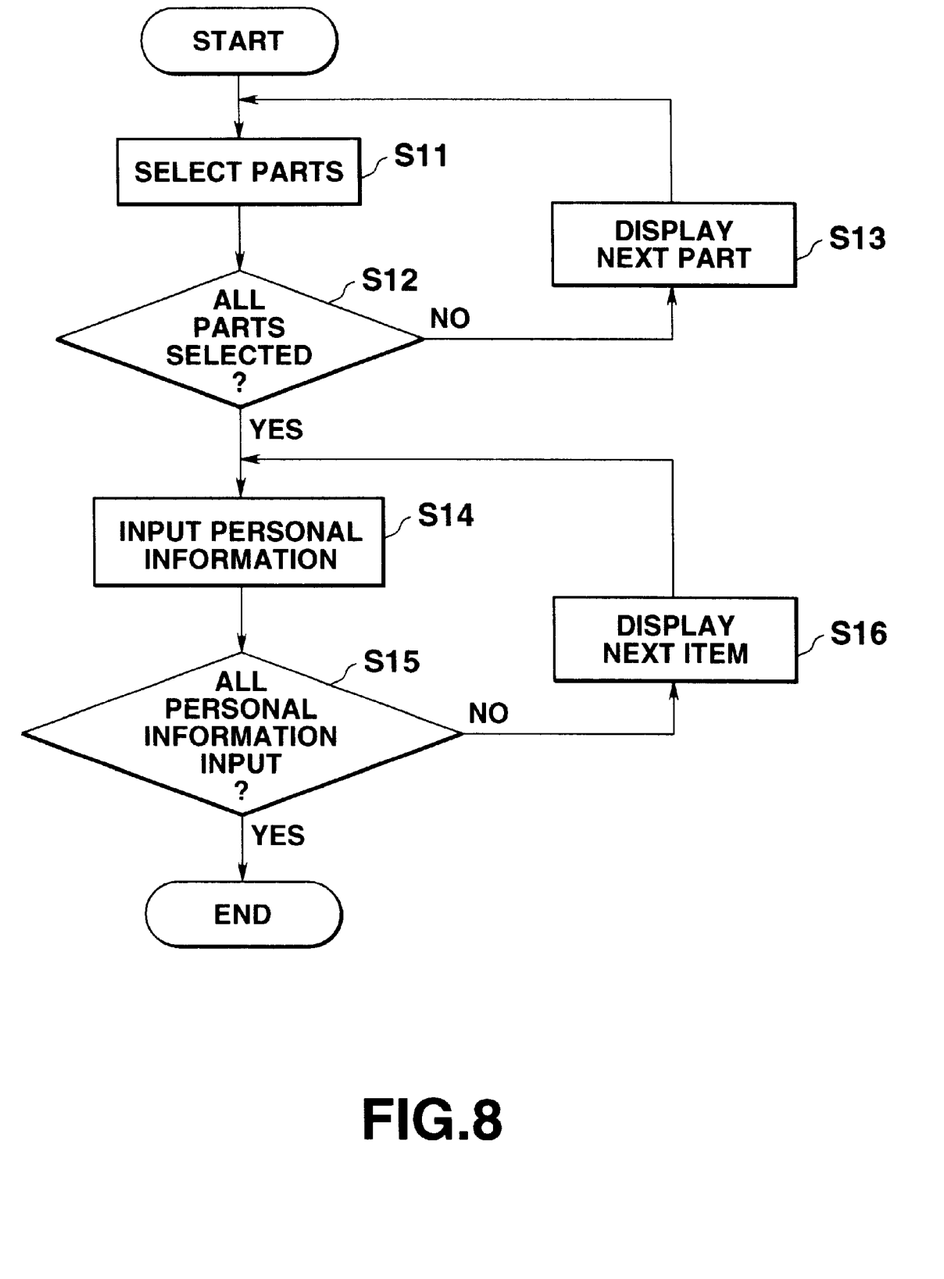
FIG. 8 is a flowchart for the home page creation processing at the terminal.
Figure 10:
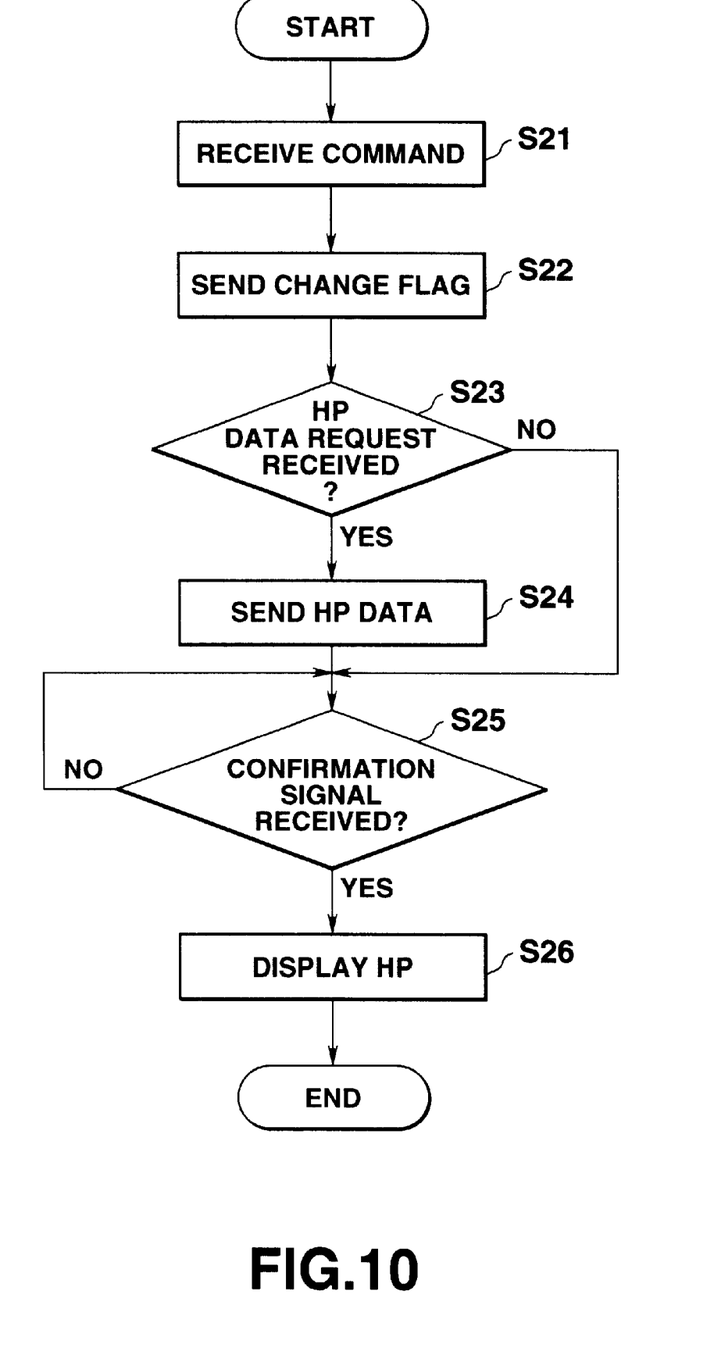
FIG. 10 is a flowchart for home page data transmission processing at the terminal.
Figure 13:
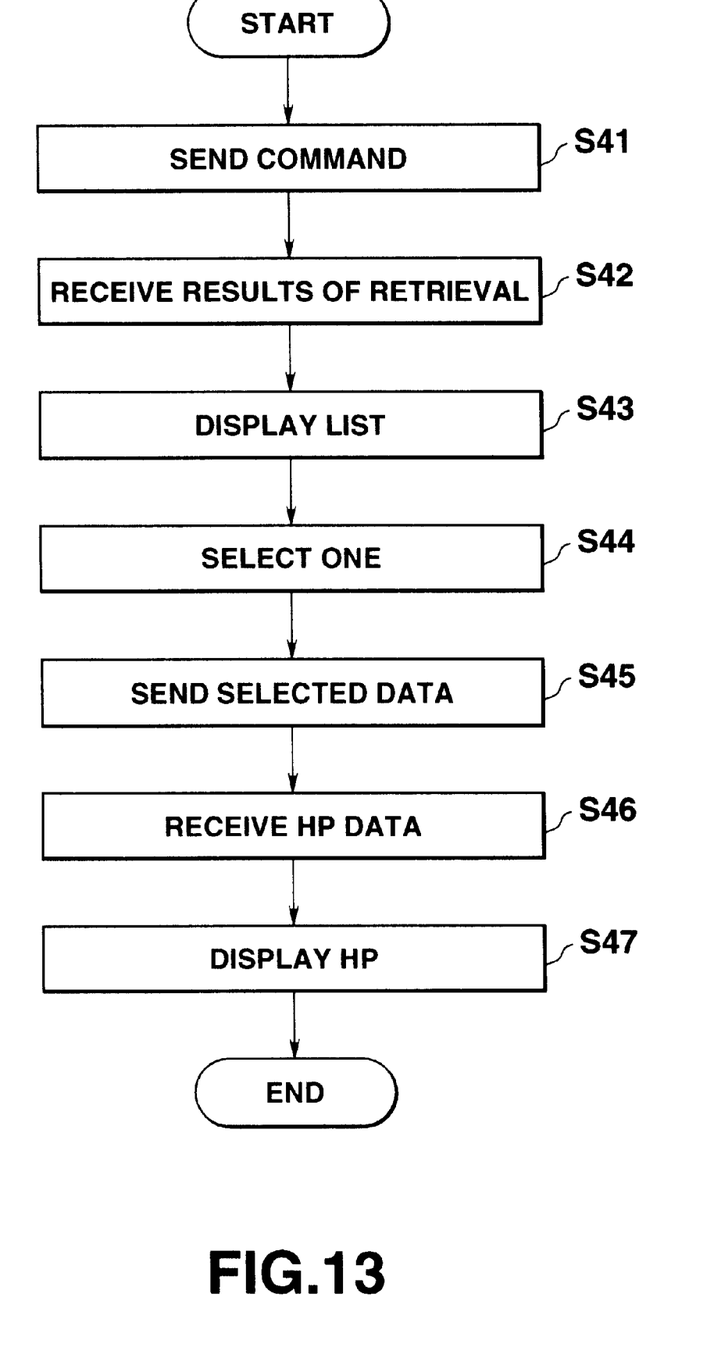
FIG. 13 is a flowchart for friend introduction processing at the terminal.

The CPU 11 reads programs such as shown in the flowcharts of FIGS. 8, 10 and 13 and other programs from the storage unit 13 into the RAM 12 for execution. The CPU 11 controls each section of the terminal. The CPU 11 has multiple general registers for program execution.

The RAM 12, comprise a semiconductor memory and, is used as the main storage area for the CPU 11.

Figure 3:
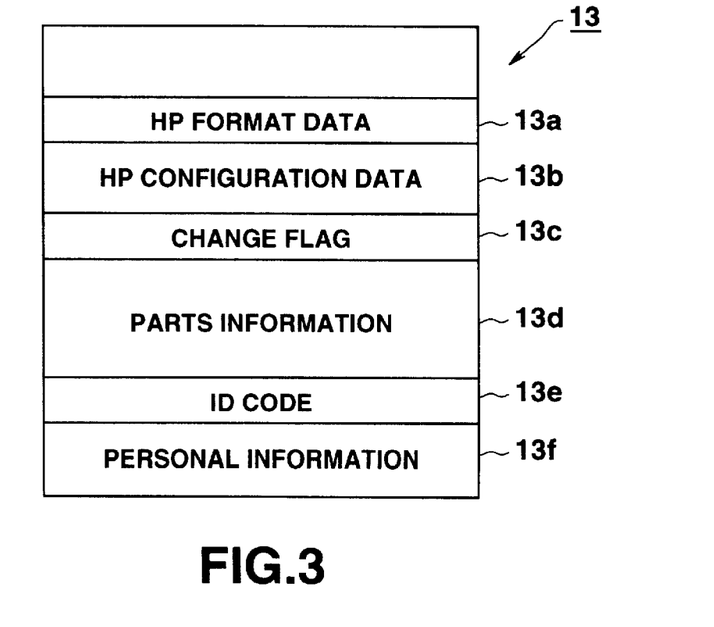
FIG. 3 shows a memory map of the storage unit of the terminal of FIG. 2.

The storage unit 13, comprise a magnetic disk drive by way of example, and stores data about a home page shown in the form of a memory map in FIG. 3 in addition to the programs.

Figure 12:
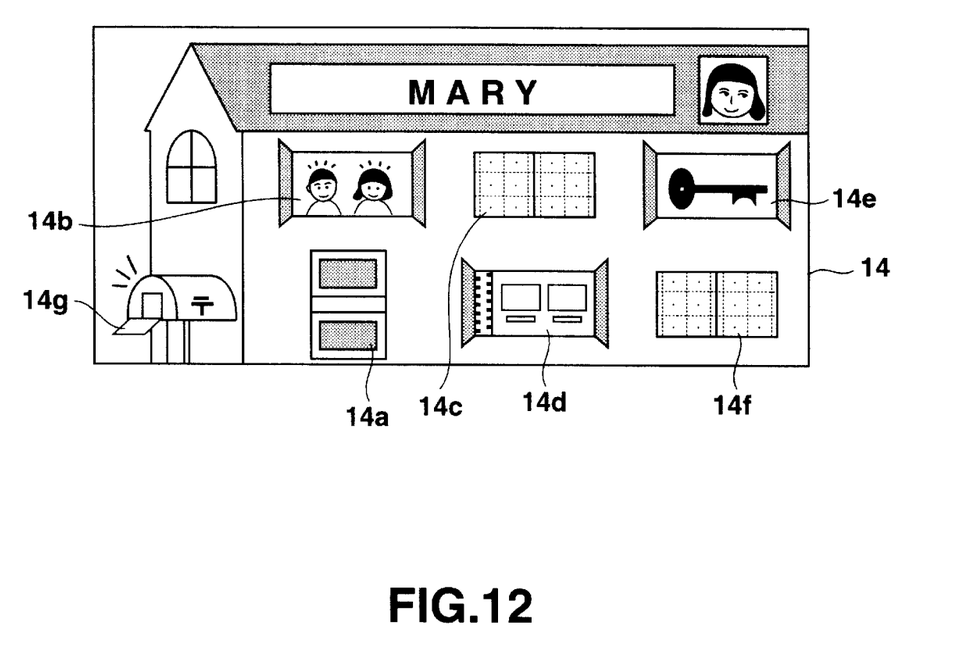
FIG. 12 shows a display example of a home page at the terminal.

The home page displayed at each terminal is an initial image displayed on screen when a member who is a subscriber to a service provider makes access to the server 2 for receiving a service therefrom or an image providing information for introducing himself or herself to other members. An example of a home page is illustrated in FIG. 12.

This home page is an image whose motif is a house. In the roof portion there are displayed the last name or nickname and a portrait of a person who sets up the home page. A door 14a is an icon for opening the self-introduction page. Windows 14b to 14f are used as icons for receiving a variety of services from the server 2. The home page is made up from parts such as roof, door, windows, and mailbox.

When a member connects to the server 2, his or her home page is first displayed at the terminal. Touching the-mailbox icon 14g on the home page enables the member to see e-mail addressed to him or her and send e-mail. Each of the window icons is operated to make a request to the server 2 for a service. For example, the window icon 14b is one for making a request for the friend-introduction service which will be described later.

The window icon 14c is used for displaying a URL (Uniform Resource Locator) list of home pages that the user often watches. The user can enter the world of WWW services that allow the user to watch other general home pages with the operation of this icon 14c as the starting-point.

The window icon 14d is used for allowing the user to write memorandums or draw pictures using the tablet 16 and preserving them in the server 2 if necessary or reading out the memorandums or pictures already preserved for display.

The window icon 14e forms the entrance to a secret zone. The user must enter a password before he or she enters the secret zone. The user can share a password with a friend to exchange information without being known to the third party.

Figure 4:
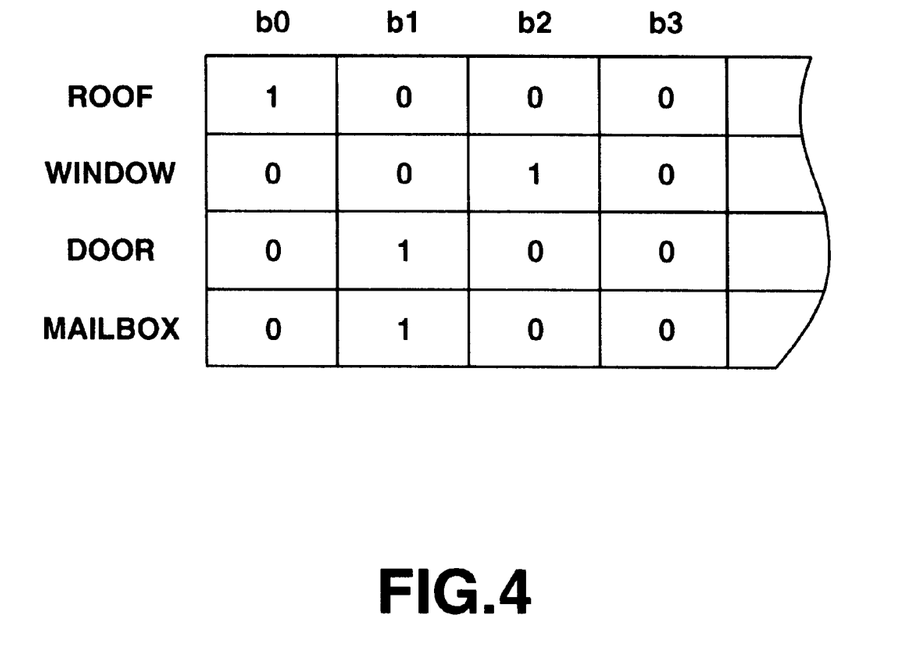
FIG. 4 shows an example of parts information in the memory configuration of FIG. 3.

As shown in FIG. 3, the storage unit 13 of the terminal stores a home page format 13a to create such a home page as described above. The home page format data 13a indicates the basic form (arrangement) of the home page and stores the display location of each part comprising a house. Home page configuration data 13b has image data for each of the parts, such as the roof, window, etc., of the house on the home page. A change flag 13c includes a flag counter of multiple bits and is incremented by one when a change is made to the home page data, which will be described later. Parts information 13d indicates each part selected in home page creation processing to be described later by turning on a corresponding bit as shown in FIG. 4.

An ID code 13e is a unique code issued to the member by the service provider.

In the other area of the storage unit 13 are stored programs run by the CPU 11 and data for the programs. Also, in the storage unit 13 is stored personal information 13f the home page provides or issues. In the present invention, the parts information 13d and the personal information 13j form the home page data.

The display unit 14, which is, for example, a liquid crystal display unit, displays the home page on the basis of the results of processing by the CPU 11 and data sent from the server 2 by processing to be described later.

The keyboard 15 has character and numeric keys for entering individual information to be described later as character data. In addition, the keyboard has command keys for instructing the CPU 11 to perform various functions.

The tablet 16 is adapted to enter a point at which a pen touches its surface as coordinate data. The tablet includes a transparent material and is provided above the display unit 14. The tablet 16 is used to specify friend select processing and to set up friend search conditions as will be described later.

The communication device 17 is equipped with line terminating equipment such as a modem. The communication device 17 logically connects communications lines with the server 2 and controls data transmission.

Figure 5:
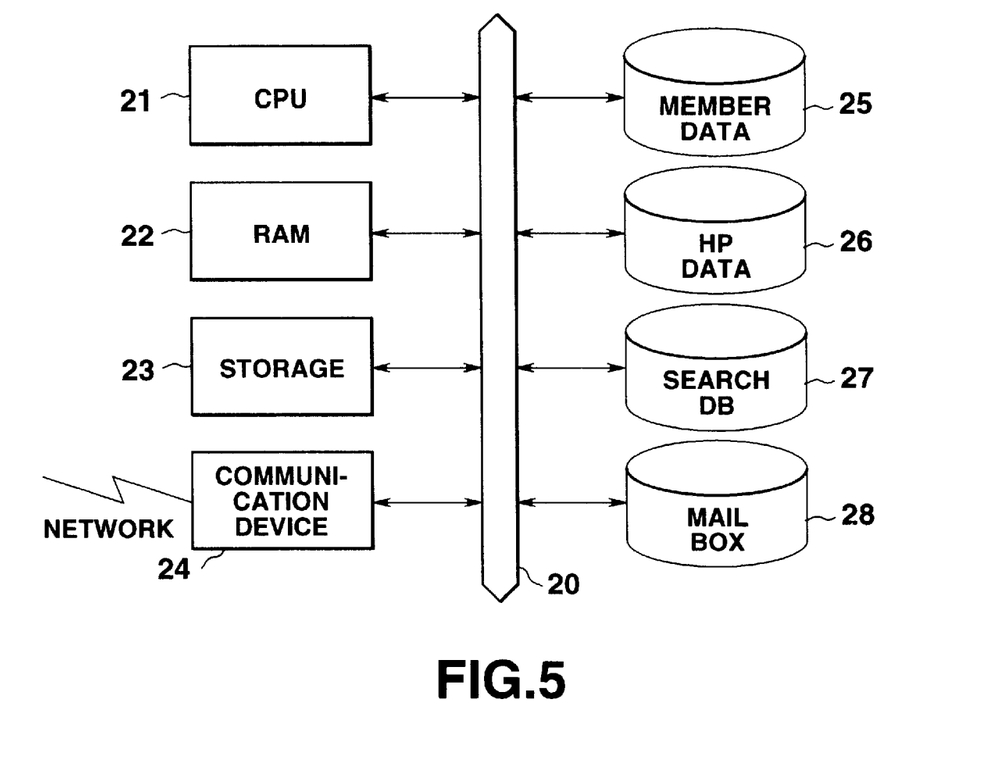
FIG. 5 is a block diagram of the server in the information providing system of the present invention.

Referring to FIG. 5, there is illustrated in block diagram form an arrangement of the server 2.

The server 2 is comprises a CPU 21, a RAM 22, a storage unit 23, a communication device 24, a member data file 25, a home page data file 26, a search database 27, and a mailbox 28, which are interconnected by a bus 20.

Figure 11:
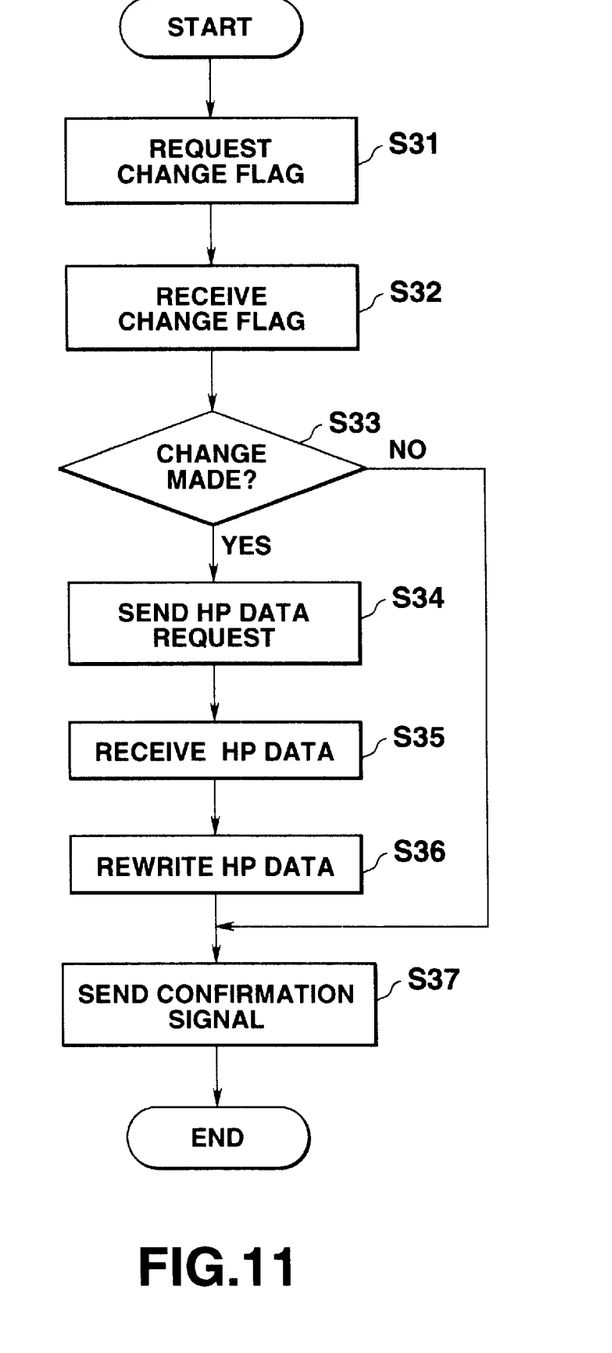
FIG. 11 is a flowchart for home page data reception processing at the server.
Figure 14:
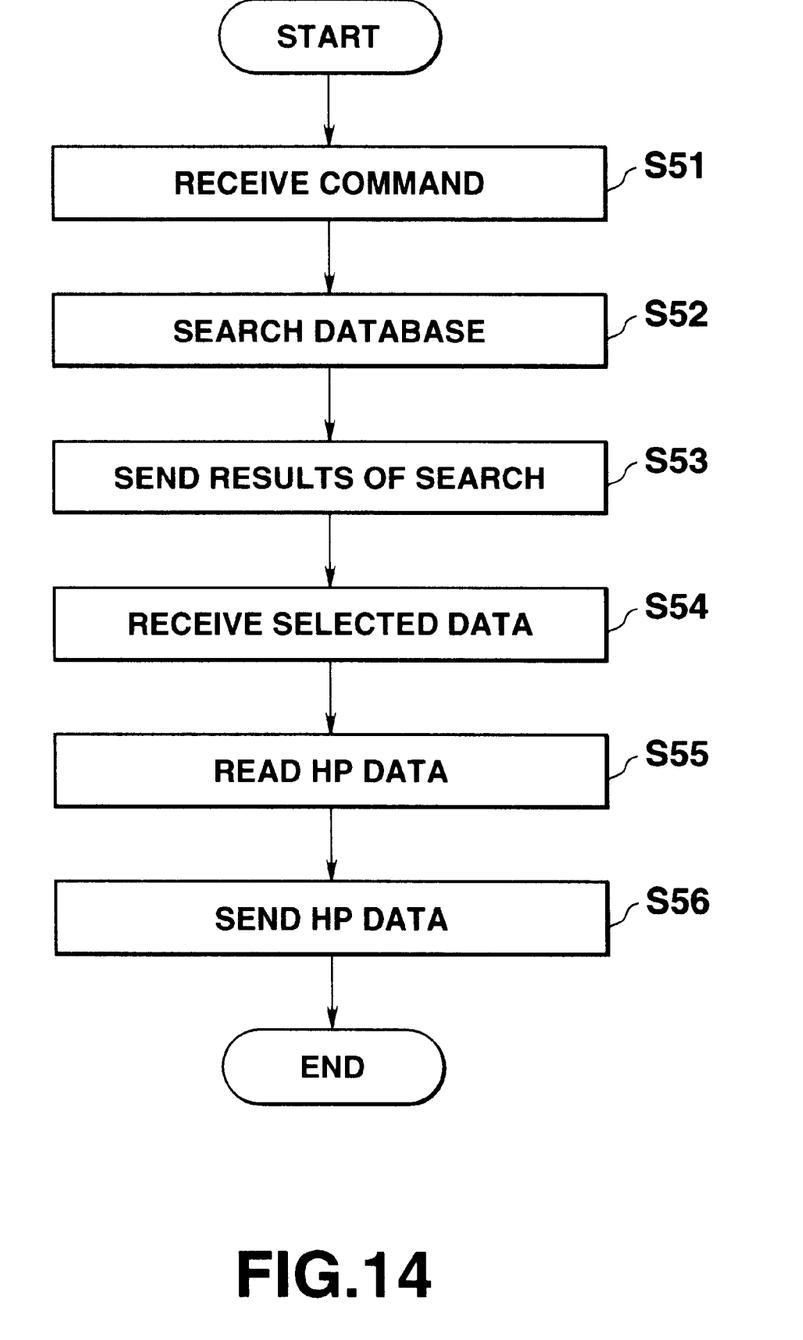
FIG. 14 is a flowchart for friend introduction processing at the server.

The CPU 21 reads programs i n the form of flowcharts of FIGS. 11 and 14 and other programs stored in the storage unit 23 into the RAM 22 for execution. The CPU 21 controls each component of the server 2.

The RAM 22, comprises a semiconductor memory and, serves as the main storage area for the CPU 21.

The storage unit 23, comprise a magnetic disk drive by way of example, stores processing programs run by the CPU 21.

The communication device 24 is equipped with line terminating equipment such as a modem. The communication device 24 connects communications lines with the terminal 1a to 1c and controls data transmissions to and from the terminals 1a to 1c. In addition, the communication device 24 connects communications lines with other servers on the Internet 4 and controls data transmissions to and from those servers.

Figure 6:
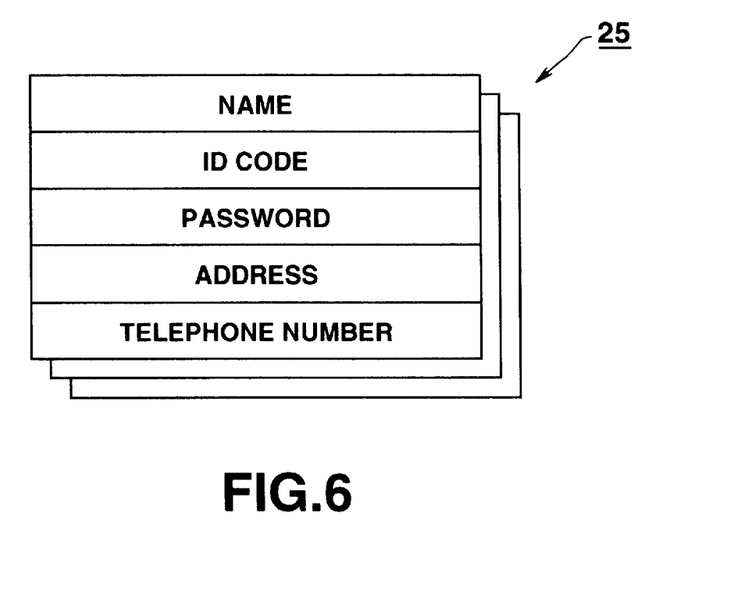
FIG. 6 shows the configuration of the member data file in the server of FIG. 5.

The member data file 25 stores, as shown in FIG. 6, the name, ID code, password, address and telephone number of a member who has made a contract with the service provider in which the server 2 is installed.

Figure 7:
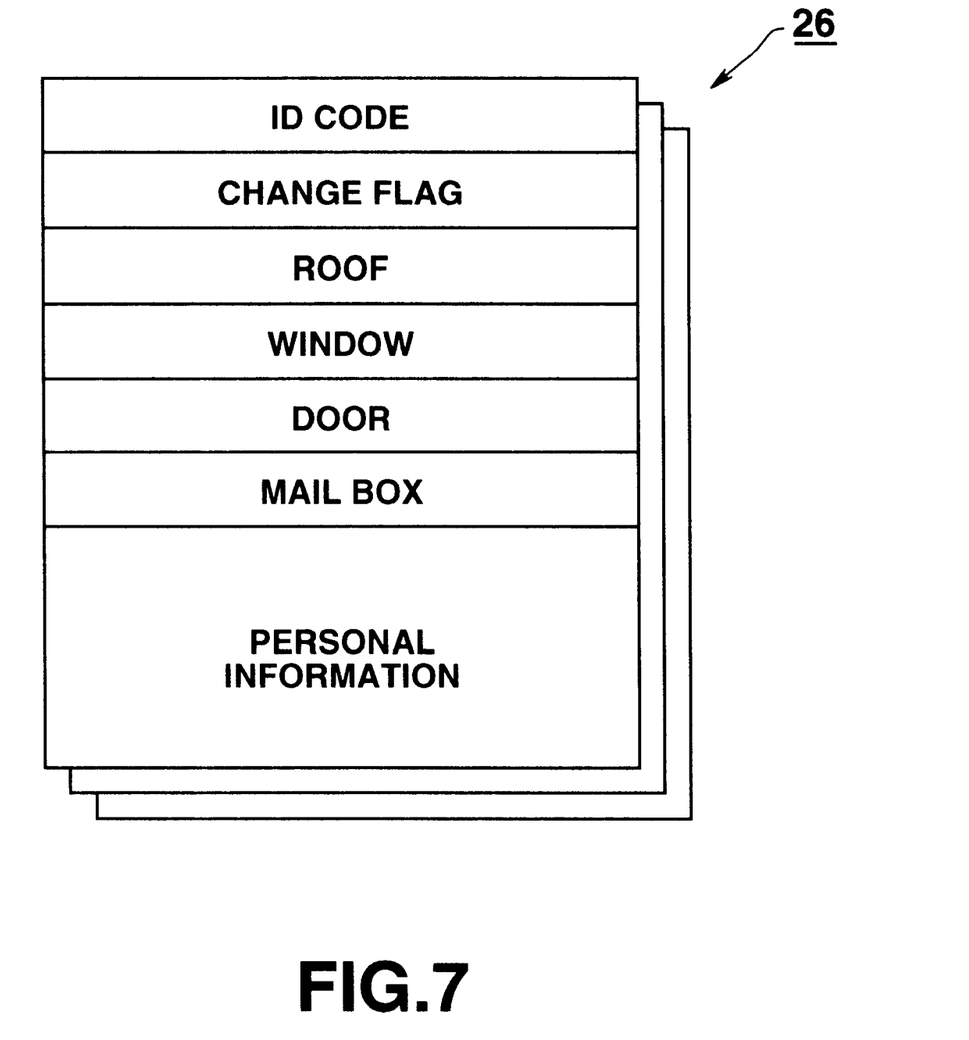
FIG. 7 shows the configuration of the home page data file in the server of FIG. 5.

The home page data file 26 stores, as shown in FIG. 7, home page data (parts information 13d and personal information 13j) sent from the terminals 1a to 1c together with their ID codes.

The search database 27, which is used for the friend introduction processing, stores data indicating where in the data file 26 home page data of each member is stored by hobby, hometown, or the like.

The-mailbox 28 stores e-mail addressed to the user.

Hereinafter, the processing in the information providing system according to the present embodiment will be described.

Now, the processing of the terminal 1a or between the server 2 and the terminal 1a will be described.

First, using the terminal 1a, a user creates a home page for introducing his or her profile. The home page is created when the user purchases the terminal 1a and is then registered in the service provider as a member. The user can recreate the home page according to a change in his or her liking or situation even after it has been created once.

FIG. 8 is a flowchart for home page creation processing at the terminal 1a. The home page creation processing starts with the operation of a home page creation key "HP" on the keyboard 15.

When the processing starts, the parts of a house for creating a home page are selected in accordance with the display screen of the display unit 14 (step S11).

The parts are specified and selected in accordance with such home page creating images as shown in FIGS. 9A to 9D.

Figure 9A:
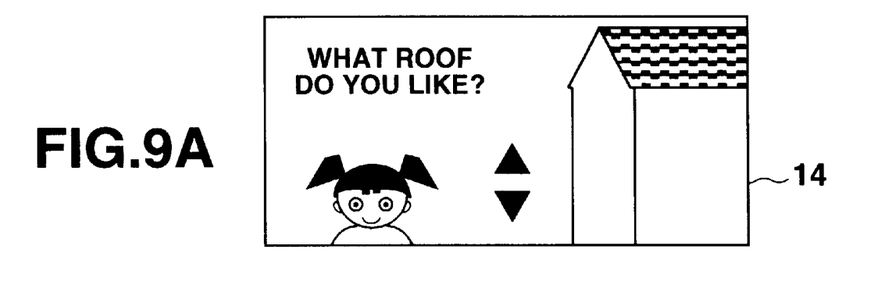
FIGS. 9A, 9B, 9C, and 9D show display examples of home page creating images on a screen at the terminal.

First, as shown in FIG. 9A, a roof selecting image is read from the home page configuration data area 13b in the storage unit 13 and is then displayed on the display unit 14. When the user touches that coordinate position on the tablet 16 which corresponds to the position of either icon "▲" or "▼" displayed on the screen, the parts representing roofs contained in the home page configuration data stored in the storage unit 13 are displayed one after another. When a roof that the user desires appears on the screen, the user operates a determination key 15b on the keyboard 15, thereby deciding a part to be selected as the roof.

Figure 9B:
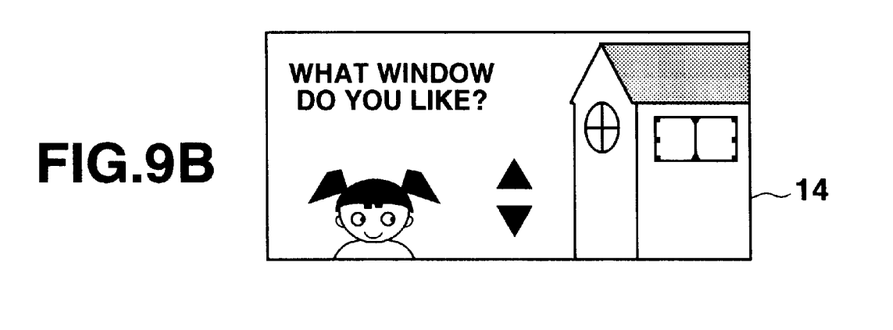
Figure 9C:
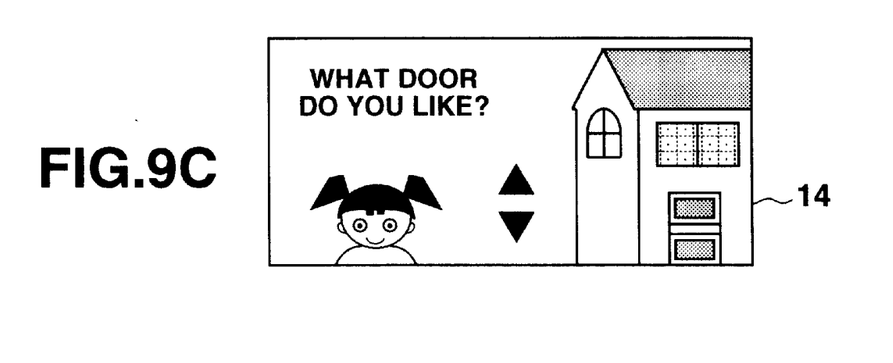
Figure 9D:
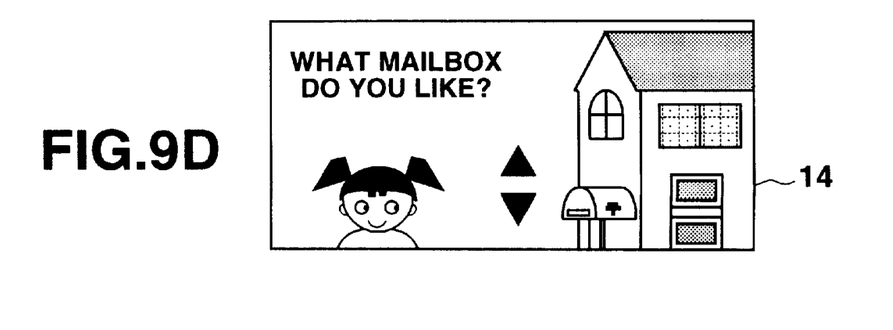

When a part is selected in step S11, it is determined in step S12 whether all the parts have been selected. When it is determined that all the parts have not been selected yet, the next part is displayed in step S13 and the procedure returns to step S11. In this case, such a window selecting image as shown in FIG. 9B is displayed on the display unit 14 and a window is likewise selected in accordance with the image. After that, a door selecting image is displayed on the display unit as shown in FIG. 9C. After the selection of a door has been made, a mailbox selecting image is next displayed as shown in FIG. 9D and a mailbox is selected in the same way. Thus, if all the parts have been selected, then corresponding bits in the parts information data become turned on as shown in FIG. 4.

When it is determined in step S12 that all the parts have been selected, personal information are entered through the keyboard 15 in accordance with itemized questions appearing on the display unit 14. Entered data is stored in the storage unit 13. Upon entry of personal information for one item, it is determined whether personal information have been entered for all the items in step S15. The questions include items of hobby, hometown, favorite food, favorite color, special talent, etc. The personal information is used as data for a user to introduce himself or herself to others who will watch the home page or condition data used when the server 2 provides the friend introduction service.

If it is determined in step S15 that personal information have not been entered yet for all the items, the procedure goes to step S16 in which a question in the next item is displayed and then returns to step S14.

If, on the other hand, it is determined in step S15 that the entry of personal information has been finished for all the items, then the procedure comes to an end.

Next, the operation when the user of the terminal 1a makes access to the server 2 to receive a service from the service provider will be described.

This operation is divided into two stages. In the first stage, the server 2 registers or updates home page data when the user creates a new home page or changes the home page already created and, in the second stage, the user receives a service from the server 2.

The first-stage process will be described with reference to the flowcharts shown in FIGS. 10 and 11. FIG. 10 is a flowchart illustrating the operation in the terminal 1a for transmitting home page data to the server 2, and FIG. 11 is a flowchart illustrating the operation in the server 2 for receiving home page data from the terminal 1a.

When the connection between the terminal 1a and the server 2 is established, the server 2 sends a command to the terminal 1a to request it to send a change flag (step S31 in FIG. 11). Upon receipt of this command (step S21 in FIG. 10), the terminal 1a reads the change flag from the storage unit 13 and then sends it to the server 2 (step S22). After that, the terminal 1a then waits to receive from the server 2 a command to request the transmission of home page data (hereinafter referred to as a home page data request) and then makes a determination of whether the home page data request has been received from the server 2 within a predetermined period of time (step S23).

On the other hand, upon receipt of the change flag from the terminal 1a in step S32, the server 2 matches the received change flag with a change flag stored in the home page data file 26 to determine whether a change has been made to the home page data at step S32 in FIG. 11.

In the case of the first connection, since new home page data has been created, the change flag has been changed from "0" to "1". When the flag is "1", it is determined that a change has been made to the home page data (step S33 in FIG. 11). As a result, the server 2 sends a home page data request to the terminal 1a (step S34 in FIG. 11). Even in the case where a change is made to the home page image or personal information after the home page data has been entered in the server 2, the change flag is set "1". In this case as well, the server 2 sends a home page data request to the terminal 1a.

When a transmission of a home page data request has been made by the server 2, it is determined in step S23 in FIG. 10 on the terminal side 1a that the home page data request has been received. In this case, the terminal 1a sends home page data to the server 2 (step S24 in FIG. 10). The home page data contains parts information 13d and personal information 13j. The parts information 13d may be sent in the bit configuration as it is shown in FIG. 4. Alternatively, it may be sent like (b0, b2, b1, b1) in the order of roof, window, door, and mailbox. The procedure then goes to step S25 to wait for a confirmation signal from the server 2.

When the server 2 receives the home page data from the terminal 1a (step S35 in FIG. 11), that data overwrites home page data already stored in the home page file 36, whereby the home page data is rewritten (step S36 in FIG. 11). In addition, the change flag to be stored in the home page data file 26 is rewritten by the change flag received in step S32. The procedure then goes to step S37 to output a confirmation signal.

If, on the other hand, it is determined in step S33 that no change has been made to the home page data, then the server 2 outputs a confirmation signal in step S37 in FIG. 11 without requesting home page data.

Upon receipt of the confirmation signal from the server 2, the terminal 1a displays its home page corresponding to the home page data stored in the storage unit 13 on the display unit 14 (step S26 in FIG. 10).

The, the home page is displayed in a form shown in FIG. 12 and 15 made up of the parts specified as shown in FIGS. 9A to 9D. The user clicks the window 14b in the upper left portion of the home page to thereby make a request to the server 2 for the second-stage service, i.e., the friend introduction service.

FIGS. 13 and 14 are flowcharts illustrating the friend introduction process, which is an example of a service provided by the server 2. Specifically, FIG. 13 illustrates the process in the terminal 1a, while FIG. 14 illustrates the process in the server 2.

When the user of the terminal 1a touches the friend introduction icon 14b in the home page on the tablet 16, the terminal sends to the server 2 a command to make a request to the server 2 for the introduction of friends (step S41 in FIG. 13).

Upon receipt of that command from the terminal 1a (step S51 in FIG. 14), the server 2 retrieves members who have the same hobby, members who have the same hometown, and so on, based on data stored in the database file 26 and reads therefrom home page data of members who meet retrieval conditions (excluding the user of the terminal 1a) (step S52 in FIG. 14). The results of retrieval are sent in the form of a list to the terminal 1a (step S53 in FIG. 14).

Figure 15:
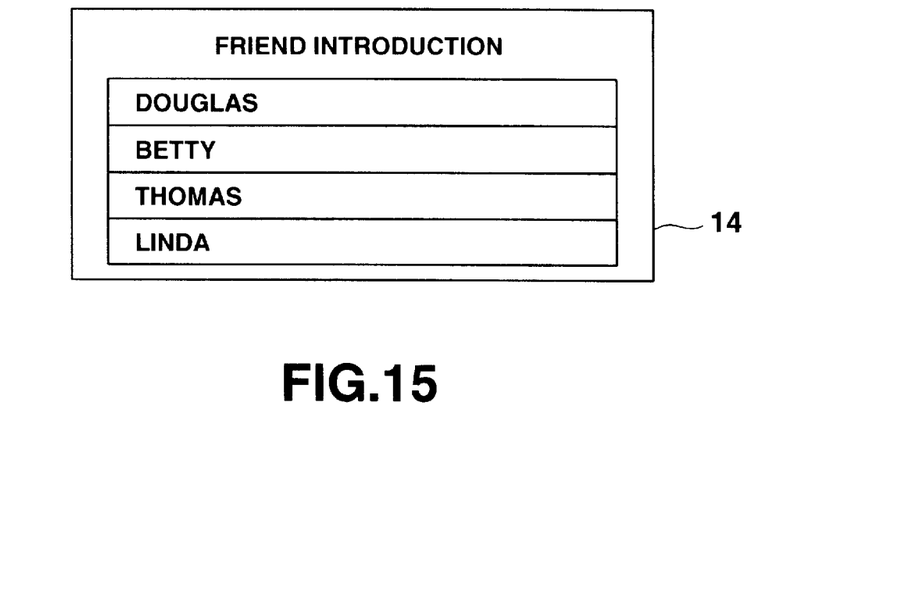
FIG. 15 shows a display example of screen images for friend introduction at the terminal.

When receiving the results of retrieval from the server 2 (step S42 in FIG. 13), the terminal 1a displays the results in the form of such a list as shown in FIG. 15 (step S43 in FIG. 13).

The user of the terminal 1a touches that position in the tablet 14 which corresponds to one of the last names or nicknames displayed on the display unit 14. Thus, one of the friends introduced from the server 2 is selected (step S44 in FIG. 13). The terminal 1a then sends to the server 2 data corresponding to the person selected in step S44, for example, data representing where in the list the selected person is located (step S45 in FIG. 13).

Upon receipt of the data on the selected person from the terminal 1a in step S45, the server 2 reads his or her home page data from the home page data file 26 (step S55 in FIG. 14) and then sends the read home page data (parts information 13d and personal information 13j) to the terminal 1a (step S56 in FIG. 14).

Upon receipt of the home page data from the server 2 (step S46 in FIG. 13), the terminal 1a takes out each part image specified by the parts information 13d from the home page configuration data 13b on the basis of the home page format 13a stored in the storage unit 13 and then displays a home page corresponding to the received home page data on the display unit 14 (step S47 in FIG. 13).

Figure 16:
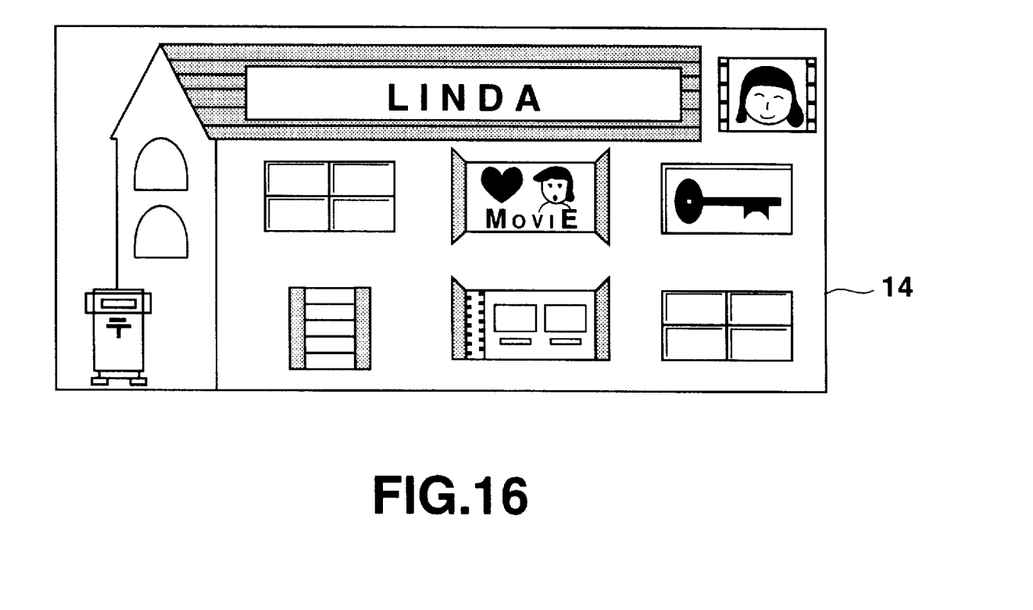
FIG. 16 shows a display example of a friend's home page at the terminal.

A display example of a home page of a given member displayed in step S47 is illustrated in FIG. 16. In this home page as well, when the door is opened (when the position on the tablet 16 corresponding to the position of the door is touched), the personal information of that given member is displayed for self-introduction.

In addition, the user, on touching a window icon, can retrieve a message of that given member from the server 2 to see it.

In this example, the mailbox icon is used to send e-mail to that given member.

As described above, the information providing system of the present invention permits a home page to be created easily.

Moreover, the friend introduction process makes it easy to be accessed by other members, helping members in issuing i.e., distributing their information.

Furthermore, when the terminal 1a is on the information receiving side, i.e., on the side that watches a home page created by another member, the server 2 need not send large quantities of all the image data, but simply sends the parts information 13d alone. A home page can be created within the terminal 1a in accordance with the parts information 13d. Thus, the quantity of information transferred between the server 2 and the terminal 1a can be reduced, saving time and cost required to send information.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, as the change flag, a flag counter is incremented by one with each update of a home page to indicate its updating. The information for indicating the updating of the home page is not limited to this. For example, the date and time of entry of home page data may be stored and used as information indicating updating of the home page.

In above-described embodiment, the server 2 sends to the terminal 1a parts information 13d as data for displaying a home page (step S56 in FIG. 14). In this case, however, even if another terminal, such as a personal computer, which is non-compatible with the terminals 1a, 1b and 1c makes access to a home page in each of those terminals, it is impossible to display the home page on that non-compatible terminal. It may be arranged such that, when a certain terminal compatible with the terminals 1a, 1b and 1c makes access to the server 2, it sends its terminal code to the server 2, and the server 2 sends parts information 13d to that terminal on receiving the terminal code, or the sensor 2 sends information into which the parts information is developed when the terminal code is not received, as home page displaying data.

Although, in the above description, the programs run by the terminals 1a to 1c and the server 2 are stored in the storage units 13 and 23, these storage units may be semiconductor memories or optical disks as opposed to magnetic disks. Additionally, the storage units may be fixed or removably mounted. Further, the terminals are not limited to portable terminals, but they may be a personal computer or the like.

What is claimed is:

1. An information providing system comprising:
    a server; and
    clients adapted to be connected to the server over a communications network,
    wherein each of said clients comprises:
        an image data memory which stores identical plural predetermined image data, said plural predetermined image data being used for displaying plural parts forming respective information issuing screen images;
        an input device configured to designate a person;
        a receiving device configured to receive part combination information representing a combination of image data forming an information issuing screen image of the designated person from said server; and
        a screen image creating device configured to read plural image data for each of the plural parts of the information issuing screen image of the designated person from said image data memory in accordance with the part combination information received by said receiving device, and to create the information issuing screen image of the designated person by combining the read image data, and
    wherein said server comprises:
        a user screen image information memory configured to store part combination information representing combinations of the image data which are stored in the image data memory of the clients and which form information issuing screen images for a plurality of persons; and
        a transmission device that, responsive to a request from a first client, is configured to read the part combination information for the information issuing screen image of the designated person from said user screen image information memory, and to send the read part combination information to the first client.

2. The system according to claim 1, wherein each of said clients further comprises:
    a selecting device configured to allow users of said clients to select respective image data for each of the plural parts stored in said image data memory to create a user-specific information issuing screen image specific to one of the clients in accordance with a combination of the selected image data; and
    an entry device configured to send part combination information representing the combination of the selected image data to said server, and to cause the sent part combination information to be entered into said user screen image information memory.

3. The system according to claim 2, wherein:
    said each of said clients further comprises:
        a change information storage device configured to store information representing that image data has been newly selected by said selecting device and that the user-specific information issuing screen image has been changed after the entry of the part combination information in said user screen image information memory of said server; and
    said server further comprises:
        a determination device that, when a first client is connected to said server, is configured to determine whether the user specific information issuing screen image of the first client has been changed in accordance with the change information stored in said change information storage device; and
        a control device configured to cause the first client to send new part combination information when said determination device determines that the user-specific information issuing screen image of the first client has been changed.

4. The system according to claim 3, wherein said server further comprises:
    a personal information memory configured to store personal information about a user of each of said clients; and
    a personal information outputting device configured to transmit personal information about a respective one of said users associated with the screen image being displayed by a third client to the third client.

5. A server adapted to be connected over a network to a plurality of clients which each comprise an image data memory that stores identical plural predetermined image data used for displaying plural parts forming respective information issuing screen images, said server comprising:
    a user screen image information memory configured to store part combination information representing combinations of the image data which are stored in the image data memory of the clients and which form information issuing screen images for a plurality of persons; and a transmission device that, responsive to a request from a first client, is configured to read the part combination information for an information issuing screen image of a designated person from said user screen image information memory, and to send the read part combination information to the first client, whereby the first client creates an information issuing screen image of the designated person based on the part combination information and the plural predetermined image data stored in the image data memory of the first client.

6. The server according to claim 5, further comprising an entry device that, after the first client has created the information issuing screen image of the designated person, is configured to receive information representing a combination of the image data from the first client and to cause the received information to be entered into said user screen image information memory.

7. The server according to claim 6, further comprising:
a determination device that, on connection to the first client, is configured to determine whether the information issuing screen image of the first client has been changed; and
a control device that, when said determination device determines that the information issuing screen image of the first client has been changed, instructs the first client to send information representing a new combination of the image data.

8. The server according to claim 7, further comprising:
a personal information memory configured to store personal information about a user of each of said clients; and
a personal information outputting device configured to transmit personal information about a respective one of the users associated with the screen image being displayed by a third client to the third client.

9. A terminal device adapted to receive personal information about members registered in a service center from a server over a communication network, said terminal device comprising:
a display unit;
an image data memory which stores the same plural predetermined image data as the image data memory of another terminal device, said plural predetermined image data being used for displaying plural parts forming respective information issuing screen images;
an input device configured to designate a person;
a receiving device configured to receive part combination information representing a combination of image data forming an information issuing screen image of the designated person from said server; and
a screen image creating device that, responsive to the part combination information received by said receiving device, is configured to read image data for each of the plural parts of the information issuing screen image of the designated person from said image data memory, and to create and display the information issuing screen image of the designated person on said display unit.

10. The terminal device according to claim 9, further comprising:
a selecting device configured to allow a user of the terminal device to select respective image data for each of the plural parts stored in said image data memory to create an information issuing screen image specific to the user in accordance with a combination of the selected image data; and
an entry device configured to send part combination information representing the combination of the selected image data to the server, and to cause the sent part combination information to be entered into the server as personal information about the user.

11. The terminal according to claim 10, further comprising:
a change information storage device configured to store information representing that image data has been newly selected by said selecting device and that the information issuing screen image has been changed after the entry of the part combination information in said server; and
a control that, on connection to the server, is configured to send information representing a combination of newly selected images to the server.

12. A storage medium for use with a server computer connected over a network to a plurality of clients which each comprise an image data memory that stores identical plural predetermined image data used for displaying plural parts forming respective information issuing screen images, said storage medium comprising:
a computer readable program adapted to cause a user screen image information memory store part combination information representing combinations of the image data which are stored in the image data memory of the clients and which form information issuing screen images for a plurality of persons; and
a computer readable program adapted to cause the server computer to read, as requested by a first client, part combination information associated with a designated person from the user screen information memory; and
a computer readable program adapted to cause the read part combination information to be sent the first client, which then creates an information issuing screen image of the designated person based on the read part combination information.

13. A storage medium for use with a terminal device which receives personal information about members registered in a service center from a server over a communication network, said storage medium comprising:
plural predetermined image data which are also stored on other storage mediums for use with other terminal devices, said plural predetermined image data being used for displaying plural parts forming respective information issuing screen images;
a computer readable program adapted to cause the terminal device to receive part combination information representing a combination of image data forming an information issuing screen image of a designated person from said server; and
a computer readable program that, responsive to the terminal device receiving the part combination information, causes the terminal device to retrieve corresponding image data from the plural predetermined image data on the storage medium and to create the information issuing screen image of the designated person based on the retrieved image data.

* * * * *